Sept. 15, 1936.  A. ALSAKER ET AL  2,054,117
MOTOR MECHANISM
Filed Dec. 9, 1929  7 Sheets-Sheet 2

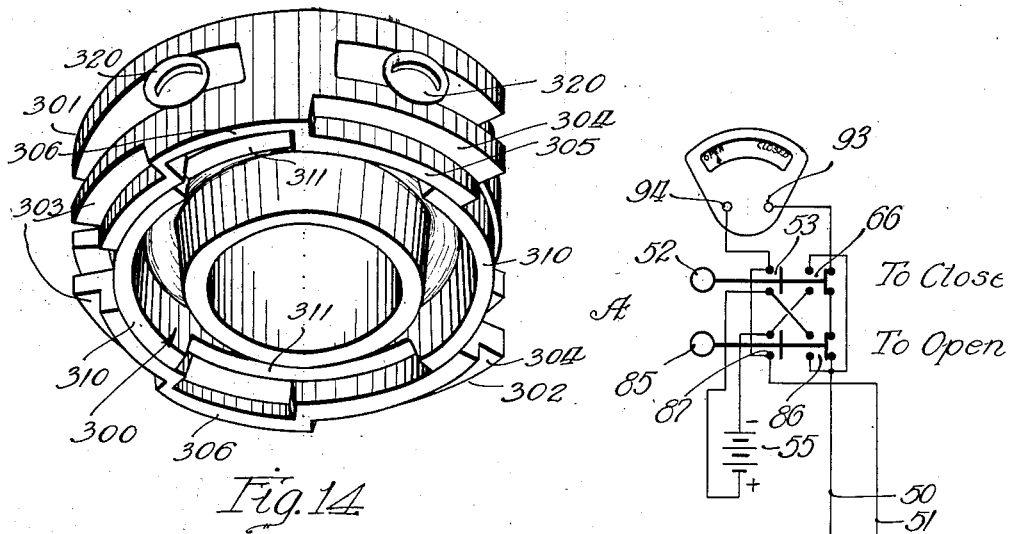
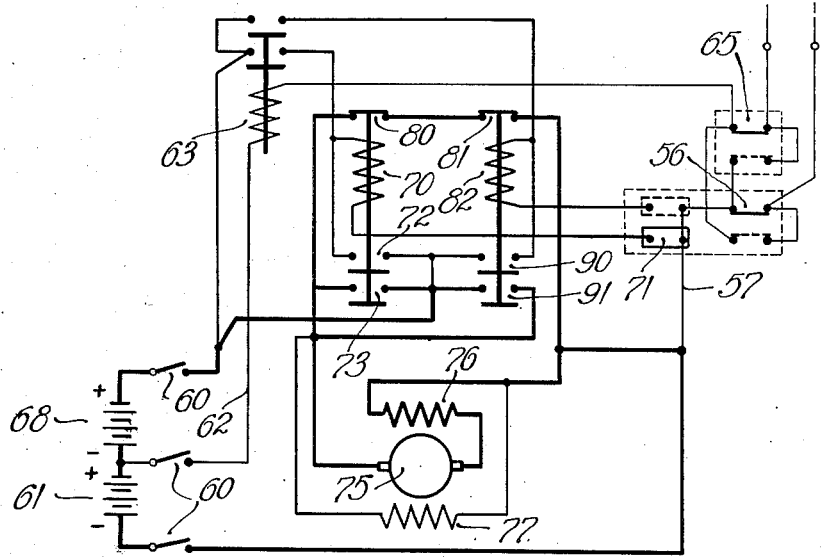

Inventors
Alfred Alsaker
Manfred Stene
By Mawsjackson Bötticher &
Drewer
Att'ys

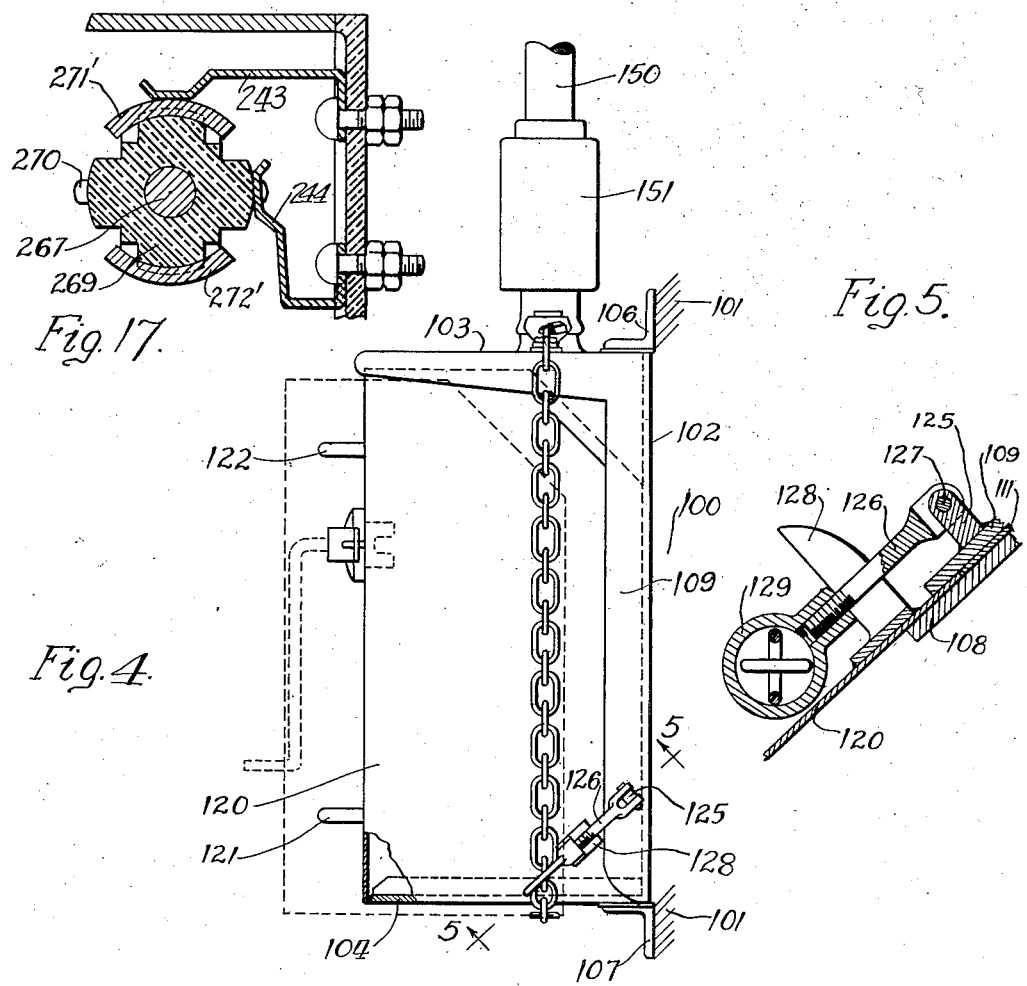
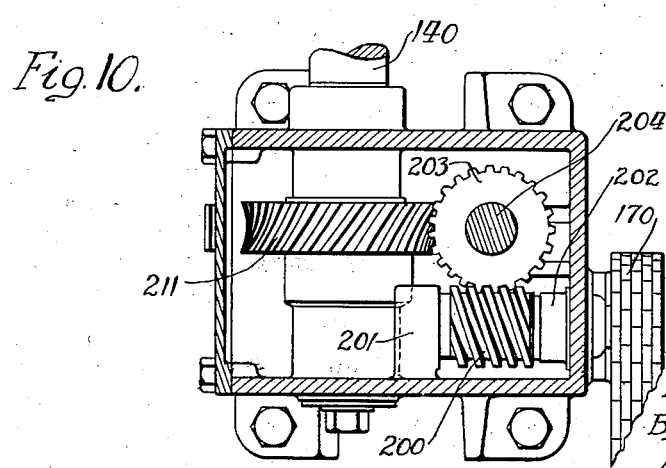

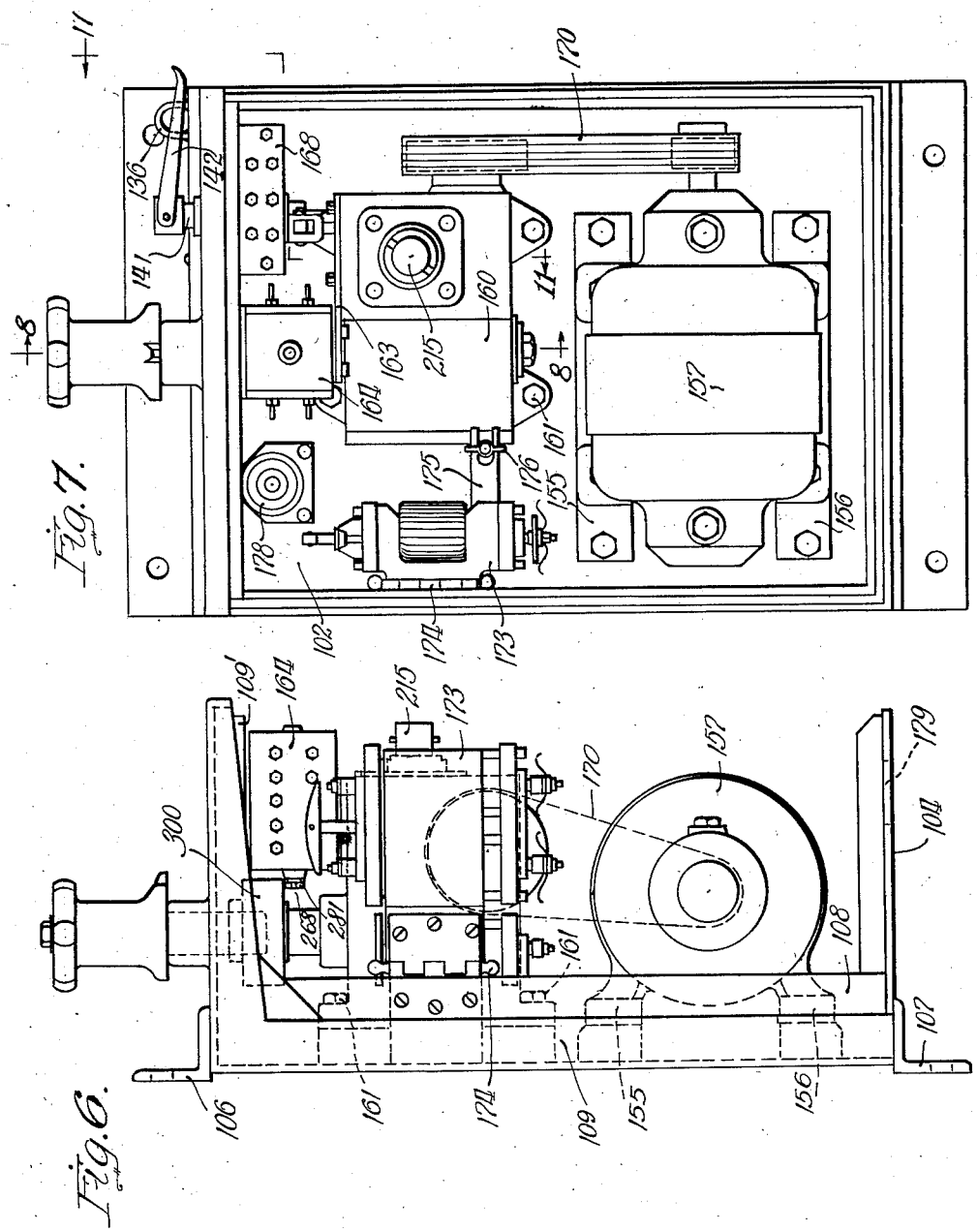

Sept. 15, 1936.  A. ALSAKER ET AL  2,054,117
MOTOR MECHANISM
Filed Dec. 9, 1929  7 Sheets-Sheet 5
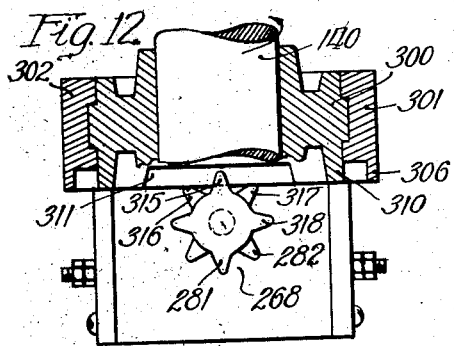
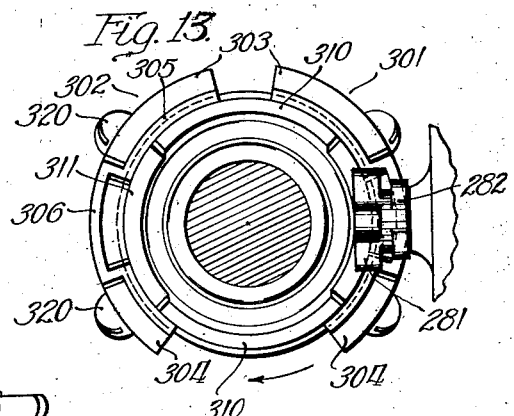
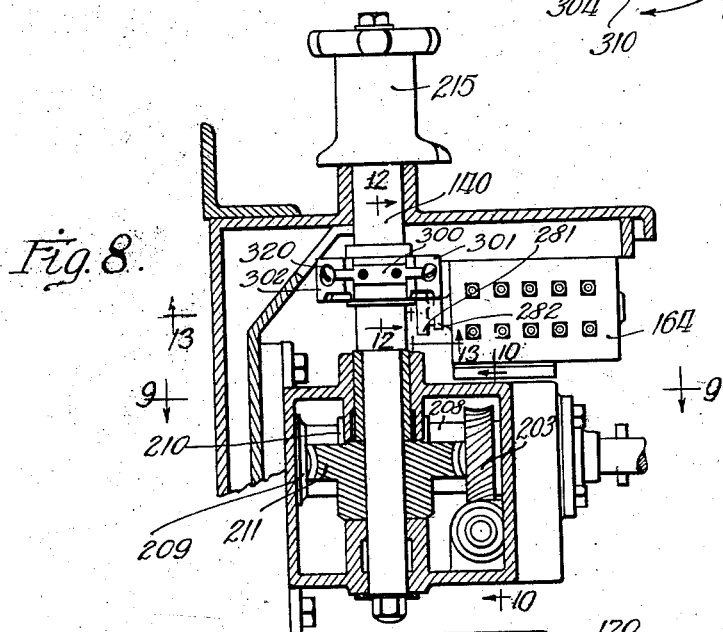
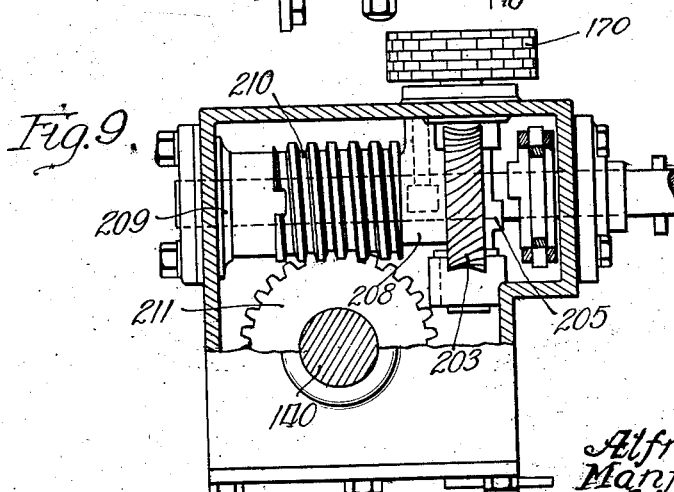
Inventors:
Alfred Alsaker
Manfred Stene
By [signature]
Attys Sept. 15, 1936.　　A. ALSAKER ET AL　　2,054,117
MOTOR MECHANISM
Filed Dec. 9, 1929　　7 Sheets-Sheet 6
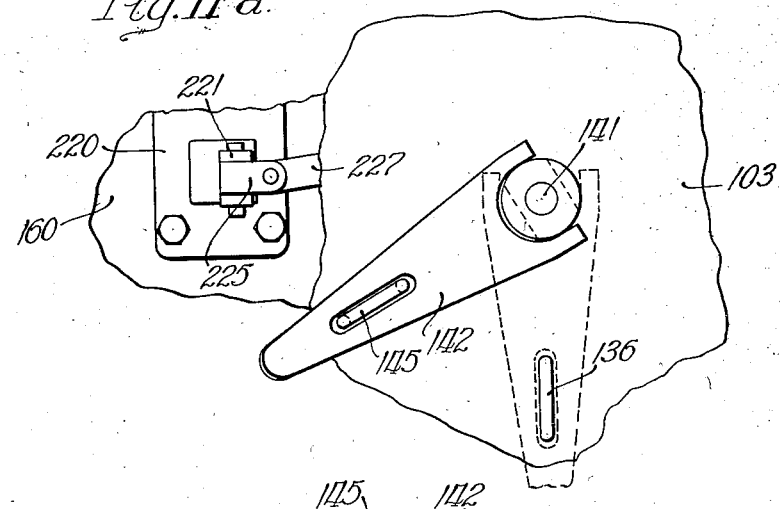
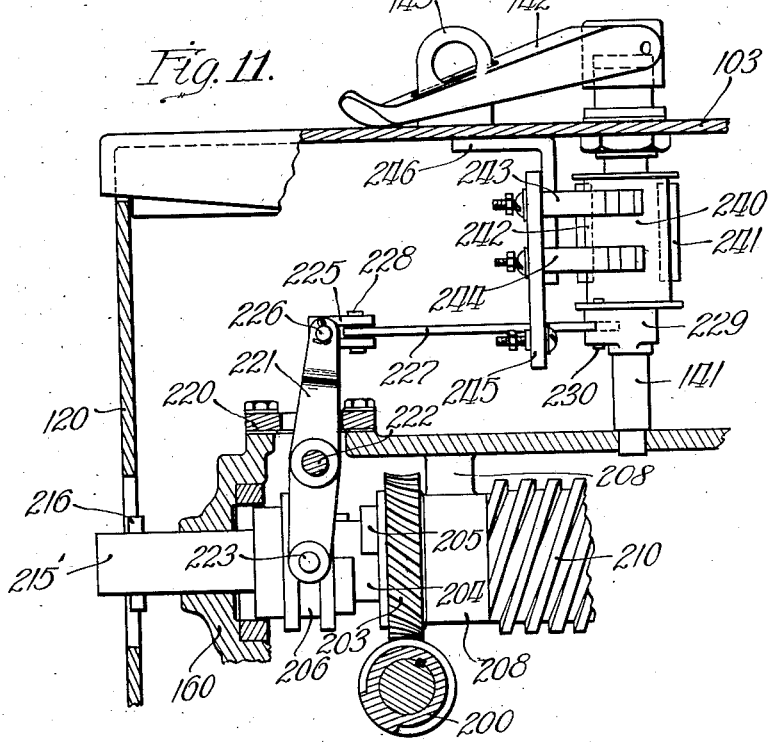
Inventors:
Alfred Alsaker
Manfred Stene
By Mowry Jackson Boucher &
Drinner Attys.

Sept. 15, 1936.    A. ALSAKER ET AL    2,054,117
MOTOR MECHANISM
Filed Dec. 9, 1929    7 Sheets-Sheet 7

Inventors:
Alfred Alsaker
Manfred Stene

Patented Sept. 15, 1936

2,054,117

UNITED STATES PATENT OFFICE 2,054,117

MOTOR MECHANISM

Alfred Alsaker and Manfred Stene, Chicago, Ill., assignors to The Delta-Star Electric Company, Chicago, Ill., a corporation of Illinois Application December 9, 1929, Serial No. 412,707

9 Claims. (Cl. 200—92)

This invention relates to switch operating mechanism, and more particularly to such mechanism as is adapted to operate high voltage disconnect switches. This invention is particularly applicable to mechanism of the above type that may be motor operated.

Outdoor disconnect switches are generally mounted on a pole or other structure which is not particularly suitable for supporting a large or cumbersome switch operating mechanism. It is one of the objects of the present invention to provide a motor operated switch operating mechanism wherein the parts are so located with respect to one another as to provide a rugged and compact arrangement of minimum depth and width whereby the same may be mounted on the pole or structural column that supports the switches, thus entirely eliminating the concrete foundation that is usually required.

We have found that a dynamic brake circuit may be used to bring the mechanism to an instantaneous and predetermined stop. Insofar as we are at present aware all such mechanisms now in use depend upon a friction brake for that purpose. The brake not only adds to the weight, size and cost of the apparatus but it is also a constant source of trouble. A dynamic brake circuit, on the other hand, does not add to the weight or size of the apparatus and does not get out of adjustment. Also, provision for the establishment of a dynamic brake circuit may be made at very little cost compared to the cost of a mechanical brake.

The dynamic brake circuit that we employ is believed to be novel per se and is found to be very much superior to the mechanical brakes now in used. We prefer to provide a relay controlled in series with the motor armature for connecting and disconnecting the shunt field from the source of power. When the motor is at rest the series relay is deenergized and the shunt field circuit is open. Upon energization of the motor the relay energizes to close the shunt field circuit. Upon the establishment of the dynamic brake circuit the direction of flow of current in the series relay is reversed and after a moment delay, the relay falls back. During this moment the shunt field was energized and the armature short circuited upon itself, thus producing a powerful dynamic braking effect. The motor is brought to rest before the series relay has had time to drop back. If desired the series relay may be replaced by a centrifugal switch.

The motor circuit is controlled by suitable relays or electromagnetic switches which may be remotely controlled. The relays are preferably so arranged as to preclude any possibility of their being operated by an accidental grounding of any of the control conductors even though the system from which the power for operating the relays is obtained may be a grounded system.

We have found that two forms of the operating mechanism are necessary to cover all possible mountings of switches. The usual form is the continuous type. By "continuous" we mean that the operating lever on the vertical pipe shaft that operates the switches always turns in the same direction; that is the motor is never reversed. This pipe is always used with vertically mounted switches and requires a control bearing and operating lever level with the cross connecting rods of the switch in order to give a push and pull motion for the respective opening and closing sequences of the switch. That is, the vertical operating shaft has a toggle lever at the top joining with the inter-connecting rod by means of clevises and a universal joint and so arranged that the motor mechanism stops just as it reaches toggle position every 180° of its travel.

This type is also used with horizontal and underhung mounted switches when a control bearing can be conveniently put in. In some cases, however, it is difficult or impossible to use a control bearing and toggle lever with horizontally mounted switches. When this is the case another type of mechanism, which is called the reversible type, is used. By "reversible" we mean that the operating motor that operates the switches rotates in one direction for producing a closing of the switches and in the opposite direction for opening the switches.

We prefer to provide means for operating the mechanism by hand in addition to the motor operating means. In the case of continuous type of mechanism this is a relative simple matter since it is merely necessary to provide an overrunning clutch for connecting one of the motor driven worm gears to the driving shaft. The gear is free to rotate with respect to the shaft and the clutch may be arranged so that when the gear is driven, that is, when the mechanism is driven by the motor the clutch engages, whereas when the shaft is rotated by the hand operated means then the clutch overruns and the operation of the mechanism is brought about without the necessity of rotating the motor and the gearing between the motor and the clutch. In the case of the reversible type we prefer to employ an ordinary clutch and provide a clutch lever for bringing about the engagement or disengagement of the clutch.

The operating mechanism is preferably entirely enclosed to protect the same from weather. We provide an improved housing for this purpose which not only protects the mechanism from weather and the like, but also may be locked to prevent tampering with the apparatus. The housing includes a removable cover which, when removed, fully exposes all of the apparatus to render the various parts readily accessible for adjustment or repair purposes. The cover closes the front and the two vertical sides of the mechanism and means is provided for locking the cover in place. We employ improved locking means which comprises a pair of bolts on the opposite sides of the mounting frame and a chain passing through a set of eye nuts threaded on the bolts and holding the cover in place. The chain prevents manipulation of the eye nuts, thus preventing unauthorized removal of the cover. The chain may be held in place by a padlock and may also serve to lock the clutch operating lever in place. The arrangement is such that the clutch operating lever may be locked in place when it is either in its engaging or in its disengaging position, at the same time locking the cover in place.

It is a further object of the present invention to provide an improved limit switch and operating means therefor for controlling the motor circuit. The limit switch is geared to the drive shaft by means including a set of intermittent gears. The switch remains stationary until the motor has rotated the shaft into a predetermined position whereupon the intermittent gear mechanism operates the switch, thereby bringing about the deenergization of the motor. The intermittent gear mechanism is preferably adjustable to permit an independent adjustment of the point of operation of the limit switch during the disconnect switch closing operation and during the disconnect switch opening operation.

The attainment of the above and further objects of the present invention will be apparent from the following specification taken in conjunction with the accompanying drawings forming a part thereof.

In the drawings:

Figure 1 is a circuit diagram, in simplified form, showing the motor and control circuit for a continuous type of motor operating mechanism;

Figure 4 is a side view thereof;

Figure 5 is a fragmentary sectional view taken along the line 7—7 of Figure 4 and looking in the direction of the arrows;

Figure 6 is a side view of the switch operating mechanism with the cover removed;

Figure 7 is a front view thereof with the cover removed;

Figure 8 is a fragmentary sectional view taken along the line 10—10 of Figure 7 and looking in the direction of the arrows;

Figure 9 is a fragmentary sectional view taken along the line 11—11 of Figure 8;

Figure 10 is a fragmentary sectional view of Figure 8;

Figure 11 is a sectional view showing the clutch operating mechanism, said view being taken along the line 13—13 of Figure 7;

Figure 11a is a fragmentary top view thereof;

Figure 12 is a sectional view taken along the line 14—14 of Figure 8 with the lower portion of the driving shaft removed;

Figure 13 is a fragmentary sectional view taken along the line 15—15 of Figure 8;

Figure 14 is a perspective view of the intermittent driving gear;

Figure 17 is a sectional view taken along the line 19—19 of Figure 15.

Figure 3:
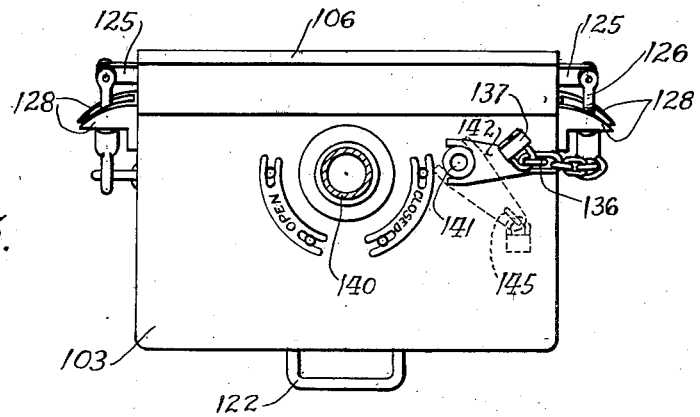
Figure 3 is a top view thereof.

Reference may now be had to Figure 1 showing a preferred form of our invention. This figure shows a circuit applied to a motor mechanism of the continuous operating type, that is a mechanism of the kind that is operated in the same direction for opening as for closing the switch. While the control circuits here shown are operated by direct current, it will be apparent as the description proceeds that alternating current could be used if desired. When this is the case it is only important that the sources of alternating current be connected with their relative instantaneous polarities the same as indicated in the drawings. The various parts are shown in the position that they occupy when the disconnect switch is open. The disconnect switch operating mechanism is located at the point B and the control apparatus is located at the point A, the control being exercised over a pair of telephone wires indicated at 50 and 51. This apparatus is of the impulse operated type, that is of the type wherein a single impulse is transmitted over the telephone wires in order to energize the relays to operate the motor to close the switch and a single impulse is likewise transmitted over the wires to energize the relays to establish an opening circuit for the motor. In order to close the disconnect switch, the motor mechanism is brought into operation by operating the closing switch 52. Upon operating this switch, a circuit is established from the positive side of the impulse battery 55, through the front contact 53 of the switch 52, thence by way of the telephone conductor 51 through the now closed limit switch contact 56 to the conductor 57, thence through the lower pole of a three pole switch 60, to the negative side of the battery 61, thence by way of the middle pole of the switch 60 through the conductor 62 and the winding of a relay 63 to the contact 65 of a limit switch which contact is now closed, thence by way of the telephone conductor 50 through the front contact 66 of the switch 52 back to the negative side of the impulse battery 55. It is to be noted that the battery 55 and the battery 61 are connected in series. The batteries are preferably 12 volt batteries and the relay 63 is adjusted to operate on 24 volts but not on 12 volts. Under these conditions it is evident that the relay 63 operates. At its lower front contact, the relay 63 establishes a circuit for the coil of the closing switch 70, said circuit extending from the positive side of the battery 68, through the upper pole of the three pole switch 60, thence through the lower front contact of the relay 63 and the winding of the relay 70 to the conductor 57 by way of the now closed limit switch 71. The conductor 57 extends back to the negative side of the battery 61, which battery is connected in series with the battery 68. The relay 70 operates and at its front contact 72 it establishes a locking circuit for itself, said circuit extending from the positive side of the battery 68, through the contact 72 and the relay winding 70, to the conductor 57 by way of the limit switch 71. The relay 70 is thus locked in its operated position and, upon release of the closing switch 52, the relay 63 may drop back without affecting the operation of the mechanism. At its lower front contact 73, the relay 70 establishes a circuit for the motor, said circuit extending from the positive side of the battery 68 to the upper pole of the switch 60 and the closed contact 73, through the armature 75, thence by way of the series field 76 to the conductor 57 and back to the negative side of the battery 61. Simultaneously therewith the shunt field 77 is energized. The motor now operates until the disconnect switch reaches its full closed position, whereupon the limit switch 71 is snapped away from the position shown and moved into the dotted line position. The circuit for the winding of the relay 70 is thus opened and this relay falls back. Upon deenergization of this relay the motor circuit is opened at the now open contact 73. At its back contact 80 the relay 70 establishes a dynamic brake circuit for the motor, said circuit extending as follows: From the left hand brushes of the motor 75, through the closed contact 80, thence by way of closed contact 81 of the opening relay 82 through the series field 76 to the right hand brush of the motor. The motor, it is to be noted, is a compound motor wherein the shunt field provides the major field flux, the series field being of appreciably smaller effect. The shunt field 74 is now connected across the motor and there is thus produced a powerful dynamic braking effect tending to bring the motor to an instant stop.

It is to be noted that, when the disconnect switch is in the open position and the various limit switches are in the position shown in the drawings, the operation of the opening switch 85 would not energize the relay 63. If, under these conditions, the switch 85 were operated instead of the switch 52, then a circuit would extend from the positive side of the impulse battery 55, through the now closed front contact 86 to the telephone conductor 50, thence by way of the closed limit switch 65 to the winding of the relay 63, thence through the positive side of the battery 61 and through the battery to the conductor 57 and limit switch 56 to the telephone conductor 51 which extends through the now closed contact 87 of the switch 85 to the negative side of the battery 55. It is to be noted that the battery 55 and the battery 61 are, under these conditions, connected in opposition, hence the voltage across the winding of the relay 63 is the difference between the two battery voltages. Since these batteries are preferably each of 12 volts the net voltage across the winding 63 is zero, hence this relay does not operate. In a like manner it is to be noted that during the closing operation of the mechanism it was presumed that the switch 52 was released, thereby bringing about deenergization of the relay 63. However, if the switch 52 is not released, then the deenergization of this relay will be brought about upon the operation of the limit switches 65, 66, and 71 when the disconnect switch reaches a position intermediate its full open and closed positions, as will be pointed out. It is to be noted that, with the switch 52 in its operated position and the limit switches in the dotted line position, the battery 55 and the battery 61 are connected in opposition across the winding of the relay 63, hence this relay does not operate.

When the disconnect switch is closed then the limit switches are in the dotted line position, and to bring about the operation of the mechanism to open the disconnect switch, the switch 85 is operated, thereby establishing a circuit for the relay 63, said circuit extending as follows: From the positive side of the battery 55 through the front contact 86 to the conductor 50, thence by way of limit switch 65, which is now in its dotted line position, to the conductor 57, it being noted that the left hand terminals of the limit switch 71 are connected together, thence to the negative side of the battery 61, through the battery to the middle pole of the switch 60, thence by way of the conductor 62 and winding of the relay 63 to the limit switch 56 which is now in its lower position, thence by way of conductor 51 to the front contact 87 of the switch 85, thence to the negative side of the battery 55. It is to be noted that the batteries 55 and 61 are again connected in series and the relay 63 therefore operates. At its upper front contact the relay 63 establishes a circuit through the winding of the opening relay 82, said circuit extending from the positive side of the battery 68, through the upper front contact of the relay 63, thence through the winding of the relay 82, through the limit switch 71 which is now in its dotted line position, and through the conductor 57 to the negative side of the battery 61. The relay 82 operates and, at its front contact 90, establishes a locking circuit for itself, said circuit extending through the limit switch 71 which is now in the dotted line position. At its front contact 91 the relay 82 establishes a circuit for the motor, said circuit extending from the positive side of the battery 68, through the front contact 91 of the relay 82, through the armature of the motor 55 and the series field 76 to the conductor 57, thence back to the negative side of the battery 61. The motor now operates. It is to be noted that the motor is operated in the same direction that it was previously operated when the relay 70 was energized. When the disconnect switch reaches its fully open position the limit switch 71 is snapped back to the position shown in full lines in the drawings, thus opening the circuit of the relay 82, thereby causing the relay to fall back. At its now open contact 91, the relay 82 opens the circuit of the motor, and at its now closed contact 81 this relay establishes the dynamic brake circuit as was previously described in connection with the dropping back of the relay 70. The motor is brought to rest by the dynamic braking effect.

We provide indicating means for indicating the open or closed position of the disconnect switch. The indicating means herein shown consist merely of a double scale voltmeter. The voltmeter is always connected across the battery 61, the polarity being controlled by the limit switches 56 and 65. As shown, the positive terminal of the battery 61 is connected to the terminal 93 of the voltmeter and the negative terminal is connected to the terminal 94 of the voltmeter. The positive side of the battery extends through the winding of the relay 63 and limit switch 65, through the back contacts of the two switches 85 and 52, to the terminal 93, whereas the negative side of the battery extends through the closed limit switch 56 and the conductor 51 to the terminal 94 of the voltmeter. When the limit switches are in their dotted line position, then the positive side of the battery 61 is connected through the relay 63 and the closed limit switch 56, which is in its dotted line position, thence through the telephone conductor 51 to the terminal 94 of the voltmeter, whereas the negative side of the battery 61 extends by way of conductor 57 and limit switch 65, which is now in its lowermost position, to the conductor 50, thence by way of the back contacts of the switches 85 and 52 to the terminal 93 of the voltmeter. The voltmeter scale is marked "Open" and "Closed" and the voltmeter needle will be deflected to the open or closed position depending upon the polarity of the connection to the voltmeter.

Reference may now be had to Figures 2 to 7 showing the switch mechanism with the cover attached thereto. The mechanism comprises a mounting frame 100 upon which the various operating parts are mounted and which is mounted upon the column 101 that supports the disconnect switches to be operated. The frame comprises a back member 102, a top or cover 103 and a bottom 104. The frame has no sides or front. An angle iron 106 is welded or otherwise secured to the top of the frame member and an angle iron member 107 is likewise secured to the bottom of the frame member. These angle iron members constitute the means for mounting the support. The angle irons 106 and 107 are provided with suitable bolt holes for bolting the frame member to the supporting structure.

Figure 2:
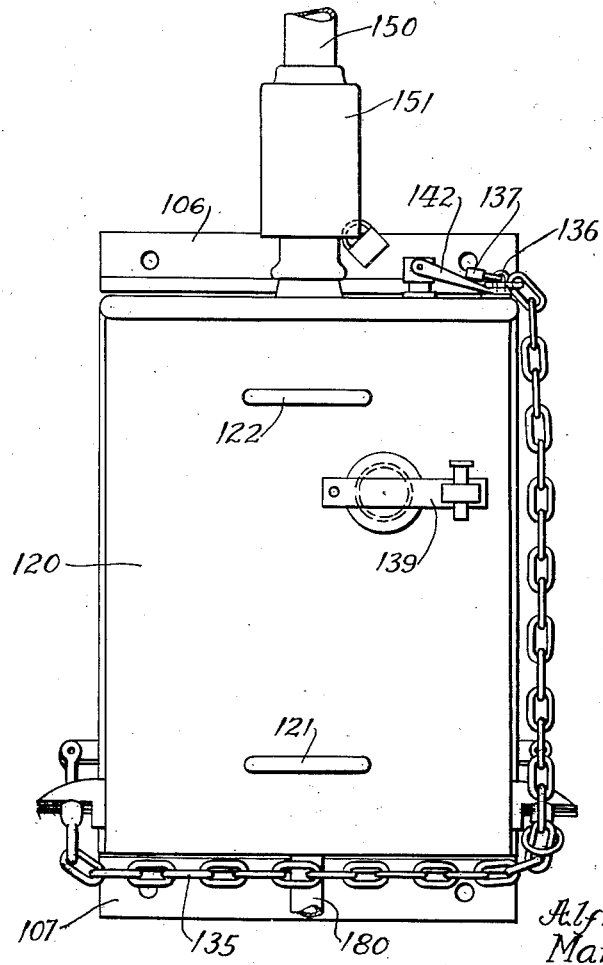
Figure 2 is a front view of the apparatus in its locked position.

The edges of the back portion are bent at right angles thereto and are reinforced by strips 108. Likewise the sides of the top portion are bent downward and reinforced by a reinforcing strip 109'. The bottom, top and rear side of the supporting frame may constitute a single piece if desired. A groove is formed between the bent portion of the back and top and the corresponding reinforcing. For this purpose a spacing strip 111 is introduced between the bent portion 109 at the side of the back of the frame and the reinforcing strip 108. A similar groove is likewise formed around the three edges of the bent over portion of the top of the mounting. A one piece cover comprising the front and the sides of the housing is indicated at 120. This cover is provided with a pair of handles 121 and 122 for gripping the same. The bent over side portions 109 of the mounting are provided with lugs 125 on opposite sides thereof to each of which is pivoted a bolt 126 by means of a pin 127. Each side of the cover member 120 is provided with a pair of lugs 128 which are adapted to cooperate with the bolts 126 for holding the cover member in place. The cover member is inserted into its position with the edges thereof in the groove between the member 108 and the member 109 at the sides of the mounting and with its top edges in the corresponding grooves at the top of the mounting. The bolt 126 is then swung into position between the lugs 128 and an eye nut 129 is screwed upon each of the bolts 126. The nut 129 comes into contact with the lugs 128 and thereby supports the cover 120 upon the mounting. The eye nut is drawn tight upon the threaded shank of the bolt 126 thereby drawing the cover member 120 upwards and firmly holding it in position. It is now not possible to remove the cover member 120 without first loosening the eye nut 129. The end link of a chain 135 passes through the eye of the nut 129 on the left hand side of the mechanism. In order to lock the cover in place, the other end of the chain is passed around the bottom of the mechanism and through the eye nut 129 on the right hand side of the housing. The chain is then drawn taut and the other end thereof is passed over a lug 136 which is welded or otherwise rigidly secured to the top of the mounting. The lug 136 is slotted for the reception of a suitable padlock 137 for preventing the removal of the chain 135. As long as the chain is secured in position it is not possible to turn the eye nuts 129 upon the threaded shanks of the bolt 126 and it is, therefore, not possible to remove the cover member. The front portion of the cover member 120 is provided with an opening into which the end of a hand crank may be inserted for operating the mechanism, as will be pointed out more in detail as the description proceeds. A pivoted closure 139 is provided for the opening. The top 103 of the mounting mechanism is provided with an opening through which an operating shaft 140 for operating the switch extends. The top of the housing has a set of indicating plates marked "Open" and "Closed" adjacent the opening through which the operating shaft extends and the shaft is provided with an indicator which moves above the plates thereby indicating the "Open" or "Closed" position of the disconnect switch. A clutch operating lever 141, which operates in a manner to be more fully set forth as the description proceeds, extends through the top of the housing and has a handle 142 pivoted thereto. The handle is provided for turning the clutch operating lever and the end of the handle has an opening that may fit over the lug 136 and be thereby held in place by the padlock 137. The clutch operating lever 142 is shown in Figures 2 and 3 in the position that it occupies when the clutch is closed for motor operation. By opening the padlock and removing the link of the chain from the lug 136, the lever 142 may be swung out of engagement with the lug and thereafter turned to move the clutch for hand operation. Under these conditions the lever 142 is located with its opening opposite a lug 145 similar to the lug 136 and likewise welded or otherwise suitably secured to the top of the mounting. The lever 142 may then be turned downward so that the lug 145 passes through the opening at the end of the lever and the chain 135 may then be secured to the lug 145 in the same manner that it is shown as being secured to the lug 136. The padlock 137 may then be used to lock the chain and the lever 142 in place. It is thus apparent that we have provided a simple and efficient locking means whereby the cover 120 may be locked to the mounting against unauthorized removal thereof and whereby the clutch operating lever 142 may likewise be locked in either of its two operative positions, a single padlock being effective in either position of the clutch operating lever.

An operating pipe or shaft 150 extends upward from the mechanism and along the structure 101 whereon the disconnect switches are mounted. The shaft 150 is coupled with the driving shaft 140 by means of a shaft coupling 151 which may be of any preferred construction. We have herein shown a shaft coupling which is of a construction such as is shown in our Patent No. 1,831,836, issued November 17, 1931, although it is to be understood that any other preferred form may be used.

Reference may now be had to Figures 6 and 7 showing the physical layout of the various operating parts within the switch mounting housing. A pair of motor mounting members 155 and 156 are bolted or otherwise suitably secured to the mounting frame 100. An electric motor 157, which may be of any approved construction, is secured to the motor mounting members in the usual manner. A speed reducing gear mechanism is enclosed in a housing 160 which is bolted or otherwise secured to the mounting frame by means of bolts indicated at 161. A supporting bar 163 is suitably bolted to the top of the gear housing 160 and supports a limit switch housing 164. The limit switches within the housing are operated by means of an intermittent gear mechanism, one portion of which is keyed to the driven shaft and is in mesh with a gear on the limit switch shaft. A switch mechanism 168 is mounted upon a bracket that is secured to the lower side of the top of the mounting frame and is actuated upon actuation of the clutch lever in a manner to be more fully set forth as the description proceeds. A silent chain drive indicated at 170 connects the motor 157 with the gear mechanism within the housing 160. The relays for controlling the motor circuit are mounted upon a frame 173 that is hinged to the reinforcing member 108 by means of a hinge indicated at 174. The relay frame is thus swingable from a position at right angles to the back of the mounting frame 100 into a position parallel to the back of the mounting frame. This permits ready access to the relays for the making of connections thereto, as well as for inspection or repair purposes. A bracket member 175 is secured to the relay frame and is provided with a forked end whereby the same may be secured to the gear housing 160 by means of a wing nut 176 thereby holding the relay frame in position. A lamp socket is located at 178 in order to provide illumination during the making of alterations or repairs upon the apparatus. The bottom 104 of the mounting frame is provided with an opening 179 for admitting the lead in conductors 180, (Figure 2) for the motor and control circuits.

Reference may now be had to Figures 8 to 11a, inclusive, showing the construction of the gear mechanism within the housing 160 and the manner of operation thereof. The silent chain 170 drives a worm 200 which is keyed to a shaft driven by the chain and is journaled in suitable bearings 201 and 202 within the housing. The worm 200 drives a worm wheel 203 that is loosely mounted upon a shaft 204. The worm wheel 203 has a clutch disc 205 formed on one side thereof and is adapted to be clutched to the shaft 204, to drive the same, by means of a clutch sleeve 206. The shaft 204 is mounted in a bearing 208 supported from one of the walls of the gear housing and in another bearing 209 at the other end of the housing. A worm 210 is keyed to the shaft and drives a worm wheel 211 that is keyed to the shaft 140 which extends out of the gear housing and through the top of the mounting frame and to which the coupling member 215 is keyed. Upon operation of the motor 157 the worm 200 is rotated and drives the worm wheel 203 at a greatly reduced speed. Assuming that the clutch is in a position for motor operation then the worm wheel is clutched to the shaft 204 and thereby rotates the worm 210. The worm 210 rotates the worm wheel 211 at a greatly reduced speed and thus rotates the shaft 140 to operate the disconnect switch. A hand drive shaft portion 215', integral with the shaft 204, extends out of the gear housing 160 for permitting hand operation of the shaft. The clutch sleeve 206 is adapted to connect or disconnect the gear 203 with the shaft 204. When the gear 203 is declutched from the shaft 204 the hand drive shaft 215' may be turned without the necessity of turning the worm wheel 203, the worm 200 and the motor. The shaft 215' extends through an opening in the cover of the housing and is provided with a pair of pins 216 that are adapted to enter slots in a hand crank whereby the shaft 204 may be turned by means of the hand crank. A clutch mounting plate 220 is mounted upon the top of the gear housing and has an opening therein which is above a similar opening in the top of the gear housing. The mounting plate has a pair of downwardly projecting fingers between which a clutch lever 221 is pivoted by means of a pin 222. The clutch sleeve 206 is provided with the usual form of groove into which a pin 223 in the end of the clutch lever extends for shifting the clutch sleeve. A forked member 225 is pivoted between the prongs of the clutch lever by means of a pin 226 that is held in place by means of a cotter pin. A lever 227 is pivoted between the arms of the member 225 by means of a pin 228 and is pivoted at its other end to a lever 229 by means of a pin 230, the lever 229 being keyed to a clutch operating shaft 141. One end of the clutch operating shaft 141 is supported by the top of the gear housing 160 and the other end thereof is supported by the top of the mounting frame 103 being rotatively held in place. A drum 240 of suitable insulating material is mounted upon the shaft 141 being keyed thereto. The drum has a set of brass contacts 241 and 242 embedded therein on the opposite sides thereof and adapted to simultaneously establish contact between a pair of springs 243—244 on one side of the drum and a similar pair of springs on the other side of the drum. The contacts 243 and 244 and the similar spring contacts on the opposite side of the drum 240 constitute the clutch controlled switch 60 of Figure 1. The spring contacts 243 and 244, as well as the contacts on the other side of the insulating drum 240 are mounted upon a terminal board 245 which is supported from the top 103 of the mounting frame by means of an L shaped bracket 246, the switch assembly being enclosed in a casing 168 (Figure 7).

It is to be noted that the worm 200 and the worm wheel 203 constitute one set of speed reducing gearing, and that the worm 210 and the worm wheel 211 constitute another set of speed reducing gearing, said two sets being connected in tandem. In each set of speed reducing gearing the worm constitutes the driving element and the worm wheel constitutes the driven element. In gearing of this type, as is well known in the art, power may be transmitted from the driving element to the driven element, that is, from the worm to the worm wheel, in either direction of rotation of the worm, but power cannot be transmitted from the worm wheel to the worm. If an attempt is made to actuate the mechanism by turning the worm wheel to actuate the worm, the mechanism is self-locking. In other words, a gearing of this type is capable of transmitting power in one direction only, namely, from the worm to the worm wheel. In view of the above, it follows that the gravitational force on the switch that is actuated by the mechanism herein described cannot be transmitted through the operating shaft 150 to turn the switch gearing, and that the operating shaft 150 is always locked by the gearing against being rotated by the switch mechanism that is connected thereto. Also, when the clutch 205 (Fig. 13) is in position for motor actuation of the mechanism it is not possible to actuate the shaft 215' manually. This is so because of the fact that at this time the clutch connects the worm wheel 203 to the shaft 204 and therefore the worm wheel 203 must turn with the shaft. However, the worm wheel is in mesh with the worm 200, and is locked thereby against rotation by the shaft 204. It is therefore apparent that the locking of the clutch in position for motor operation definitely precludes manual operation of the mechanism.

When the clutch is moved to the position shown in Figure 13 whereby the worm wheel 203 is declutched from the shaft 204, manual operation is possible. At this time the worm 210 is in engagement with the worm wheel 211 and therefore the mechanism is still locked against reverse power transmission, that is, the transmission of power from the switch that is actuated by the mechanism, to the shaft 150 (Fig. 6) and thence through the gearing to the shaft 215'. By this arrangement it is certain that the operator cannot lose control of the switch during manual operation, since the weight of the moving switch parts cannot be transmitted through the gearing to turn the hand operating shaft 215'.

By our improved locking arrangement which locks the clutch operating lever 142 as well as the cover 120, there is provided an arrangement whereby unauthorized manual operation of the mechanism is positively prevented. When the clutch lever 142 is in position for motor operation the shaft 215' is locked against manual operation and, with the cover 120 locked, it is not possible to gain access into the housing in order to move the clutch members to the position shown in Figure 13.

Figure 15:
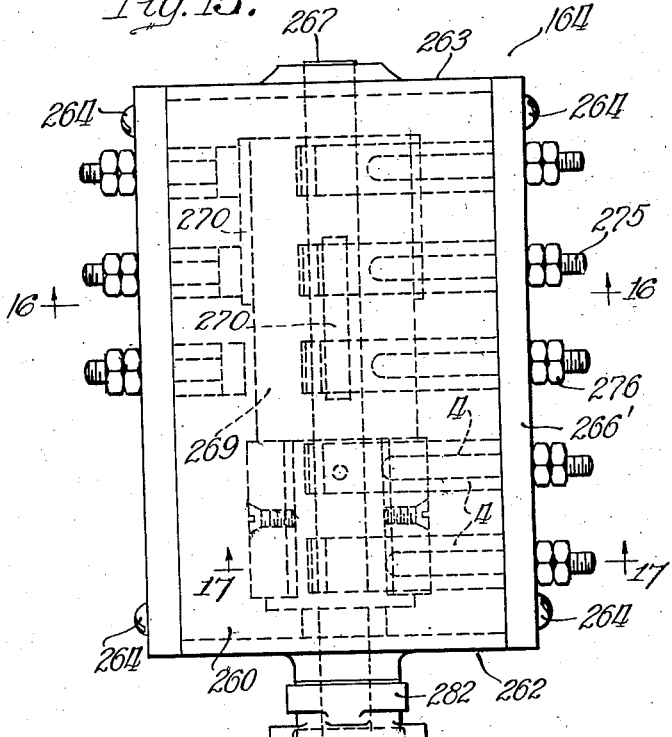
Figure 15 is a front view of the limit switch.
Figure 16:
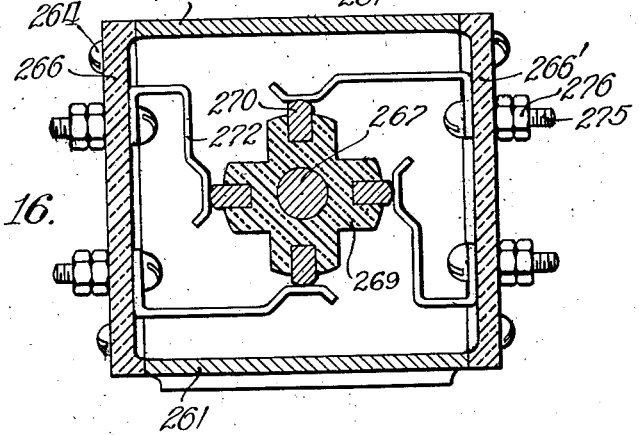
Figure 16 is a sectional view thereof taken along the line 18—18 of Figure 15.

Reference may now be had to Figures 15, 16 and 17 showing the construction of the limit switch 164. The switch comprises a housing having integral top, bottom, front and rear sides indicated respectively at 260, 261, 262 and 263. Side walls 266 and 266' are made of suitable insulating material and are suitably secured to the switch box by means of screws indicated at 264, the sides constituting the terminal boards for the switch. A shaft 267 is journaled in the front and rear walls of the switch housing and extends beyond the front wall thereof, said shaft having a gear 268 secured thereto for driving the same. A switch drum 269 of bakelite or other suitable insulating material is keyed to the shaft 267 to rotate therewith. The shaft 267 is arranged to be operated intermittently in 45° steps as will be presently pointed out. Four brass contacts 270 are embedded in spaced relationship upon the outer side of the insulating drum 269, each of said contacts being adapted to establish a circuit between two contact clips in its alternating 45° positions. In their other positions the contacts lie between the terminal clips and do not establish any circuit. At the other end of the drum 269 there are embedded two arcuate contacts 271' and 272'. These contacts are adapted to establish a circuit between the two switch springs 243 and 244 when in two of the successive 45° positions and between the other set of switch springs 243 and 244 in the next two successive positions. Thus in every position of the switch operating shaft there is a circuit between either set of the contact springs. The terminal clips are mounted upon the insulating side walls 266 and 266' by means of brass screws 275 and nuts 276, the nuts 276 serving to secure a conductor to the screws. The limit switches 56, 60, 65 and 71 of Figure 1 are included in this switch housing. The gear 268 comprises two portions, the front portion 281 and the rear portion 282. These portions constitute a single gear and each portion has four gear teeth formed thereon, the teeth being uniformly spaced, that is, 90° apart, on each gear section. The teeth on the two gear sections are staggered with respect to one another, being 45° apart.

An explanation will now be given of the manner of operation of the intermittent gear mechanism for operating the limit switches within the switch housing 164 and for this purpose reference may be had to Figures 12, 13 and 14. The driving gear of the intermittent gear mechanism comprises a limit collar 300 which is keyed or otherwise suitably secured to the shaft 140 and is driven thereby. This collar has a pair of limit cams 301 and 302 adjustably secured thereto, these cams constituting the driving means for the gear 268 that drives the limit switch. The limit cams 301 and 302 are symmetrical in construction and differ form one another as the right hand differs from the left. The cams have depressed portions 303 at one end thereof and similar depressed portions 304 at the other end thereof. They likewise are provided with a continuous elevated portion 305 which is adjacent the inner periphery of the cams at the ends 303 and 304 thereof and is adjacent the outer periphery of the cams at the portion 305 thereof. The limit collar is likewise provided with two elevated portions 310 opposite one another and each extending through substantially 90° of the periphery of the collar. Between the elevated portions 310 of the collar, the periphery thereof is depressed as indicated at 311. When the apparatus is in the position shown in Figures 12 and 13, the tooth 315 of the portion 281 of the driven gear extends into the depressed or hollow portion 311 of the limit collar and into the adjacent depressed portion of the limit cam 301, whereas the gear teeth 316 and 317 of the portion 282 of the driven gear 261 ride upon the elevated portion 306 of the limit cam 301. Assume that the limit collar is rotated by the shaft 140 in a clockwise direction as seen in Figure 13, that is, in a direction such as is indicated by the arrow in Figure 13. When the parts are in the position shown in the drawings, the gear 268 that drives the limit switch is locked against rotation in either direction since both of the gear teeth 316 and 317 rest against the elevated portion 306 of the limit cam 301. The limit collar is thus permitted to rotate without producing any effect upon the limit switch. When the limit collar comes into a position such that the depressed portion 303 comes under the tooth 317, the gear 268 will be free to rotate in a counter-clockwise direction as seen in Figure 12. At this time the elevated portion 305 of the limit cam 301 engages the tooth 315 on the portion 281 of the gear 268 and positively rotates it through ⅛ of a turn or 45°, thus bringing the gear tooth 317 into the depressed portion 303 of the limit cam and bringing the two gear teeth 315 and 318 of the gear portion 281 onto the elevated portion 305 of the limit cam. During the next 90° to 120° of rotation of the limit collar, the two gear teeth 316 and 318 rest successively upon the elevated portion 305 of the limit cam 301, the portion 310 of the limit collar, and the portion 305 of the cam 302 and are thereby held against rotation in either direction. When the elevated portion 305 of the cam 302 has been rotated beyond the gear 268 and the depressed portions of the limit collar and the cam 302 come under the gear thereby leaving it free to rotate, then the elevated portion 305 of the limit collar 302 comes into engagement with the gear tooth 317 of the portion 282 and positively rotates this gear through another ⅛ of a revolution or 45°. Further rotation of the shaft 140 causes a similar action of the driven gear 268. It is thus apparent that for every 180° of rotation of the shaft 140, the shaft upon which the gear 268 is keyed makes one-quarter of a revolution, making this in two steps of 45° each.

As previously stated, the limit cams 301 and 302 are adjustably secured to the limit collar. These cams are independently adjustable and are each secured in position by two screws 320 and 321 that pass into tapped holes in the limit collar 300. The limit cams are provided with slots and by loosening the screws 320 and 321, the cams may be turned through a limited angle upon the collar and then secured in any desired position. The limit collar is provided with a number of spaced tapped radial holes for receiving the screws 320 and 321 so that if a large adjustment of the limit cams is desired the screws 320 and 321 may be passed through different ones of the tapped radial holes in the limit collar. It is thus apparent that any desired sequence of operation of the limit switch shaft during the opening and closing operation of the disconnect switch may be obtained.

It is believed that the invention will be clearly understood from the foregoing description and drawings, which illustrate a preferred embodiment thereof. The invention is, however, not limited to the precise embodiment herein shown, the same being merely illustrative of the invention, and obvious modifications thereof will suggest themselves to those skilled in the art. What we consider new and desire to secure by Letters Patent is:

1. A switch operating mechanism, a two piece housing enclosing the same, one of said pieces constituting the back portion upon which the operating mechanism is mounted, the other piece being bodily removable therefrom to expose the mechanism, means on opposite sides of said other piece for holding it in place, a single key operated lock for preventing unauthorized manipulation of either of said means, a clutch for controlling the mechanism, clutch operating means outside of the housing, and means including said key operated lock for locking the clutch operating means.

2. A switch operating mechanism comprising a speed reducing gearing, operating motor means within the casing for operating the gearing, means external of the casing for operating the gearing, a clutch for transferring the control between the first and the second operating means, an enclosing housing for the mechanism, said housing including a cover member, a clutch operating member extending outside of the housing, and means including a single lock for locking both the cover and the clutch operating member.

3. A switch operating mechanism comprising a speed reducing gearing, an operating motor for the gearing, hand operated means for operating the gearing, a clutch for transferring the control between the motor and the hand operating means, an enclosing housing for the mechanism, said housing including a cover member, a clutch operating member extending outside of the housing, and means including a single lock for locking both the cover and the clutch operating member, said lock being effective to lock the cover and the clutch member while the clutch member is in either of its operative positions.

4. A switch operating mechanism including a housing, a closure for the housing, electric motor driven actuating means within the housing, alternate actuating means mechanically actuated from outside of the housing, a clutch within the housing for transferring control from one to the other of the two actuating means, a clutch control member outside of the housing, and a single locking member locking the clutch control member and the closure for the housing.

5. A switch operating mechanism including a mounting frame comprising the back and the top of the mechanism, switch operating means mounted on the frame and including a driving motor, a switch driving shaft, and self-locking gearing connecting the two, said gearing transmitting power from the motor to the shaft but being self-locking against the transmission of power from the shaft to the motor, alternate driving means for the shaft, a portion of the self-locking gearing being located between the alternate driving means and the motor and serving to lock the alternate driving means against transmitting power to the shaft, a clutch for disconnecting said portion of the self-locking gearing, a closure for the mechanism mounted on the frame to form a housing therewith, said alternate driving means including a driving member extending outside of the housing, a clutch control member extending outside of the housing for controlling the clutch, and locking means outside of the housing for locking the clutch control member in predetermined position and simultaneously locking said closure member against removal to prevent access to said operating mechanism.

6. A switch operating mechanism including a mounting frame of an inverted L-shape comprising the back and the top of the mechanism, said frame being devoid of sides and a front, switch operating means mounted on the frame and including a driving motor, a switch driving shaft, and self-locking gearing connecting the two, said gearing transmitting power from the motor to the shaft but being self-locking against the transmission of power from the shaft to the motor, alternate driving means for the shaft, a portion of the self-locking gearing being located between the alternate driving means and the motor and serving to lock the alternate driving means against transmitting power to the shaft, a clutch for disconnecting said portion of the self-locking gearing, a closure for the mechanism removably mounted on the frame to form a housing therewith, said alternate driving means including a driving member extending outside of the housing, a clutch control member extending outside of the housing for controlling the clutch, and locking means outside of the housing for locking the clutch control member and for locking the closure against removal.

7. In a switch housing, a switch operating mechanism including a driving motor, a switch actuating member, two serially connected sets of unidirectional power transmitting gearing connecting the motor to the switch actuating member, said gearing being self-locking against the transmission of power from the switch actuating member to the motor, alternate driving means for the switch actuating member, said alternate driving means being mechanically connected between said two sets of gearing, clutch means for disabling the set of gearing between the motor and the alternate driving means, means extending outwardly of said housing for selectively operating said clutch into engaged and disengaged position, and means for locking said selective operating means to said housing in either of said positions.

8. In combination, in a switch supporting frame, a switch operating mechanism comprising a switch operating shaft, a motor mechanism, gear means for said operating shaft, a clutch for said gear means, driving means between said motor mechanism and said gear means controlled by said clutch to provide for selective manual or automatic motor operation of said gear means, said driving means preventing manual operation of said gear means when said clutch is set in motor operating position, an operating arm for said clutch, means for completely enclosing said switch operating mechanism and having openings through which said switch operating shaft and said clutch operating arm extend, projecting eyelet means carried by said enclosing means for aligning said operating arm in motor operating position, and means for locking said closure means in position and simultaneously locking said clutch operating arm in said motor operating position upon said eyelet means to prevent unauthorized manual operation of said clutch and access to said switch operating mechanism.

9. In a switch housing including a supporting frame, switch operating mechanism mounted on said frame and including an operating shaft, serially connected sets of gearing for driving said shaft, clutch means interposed between said sets of gearing, an operating member for said clutch means, closure means engaging said frame for closing said gearing and clutch means and having an opening therein, means connected to said gearing and aligned with said opening for receiving means adapted to extend into said housing for manually actuating said gearing when said clutch is disengaged, said operating member for said clutch means extending through said closure means, a projecting loop member on said frame adapted to have interlocking engagement with said operating member when said clutch is in engaged position, and means for simultaneously locking said closure means to said frame and passing through said projecting member to lock said operating member in clutch engaged position to said frame.

ALFRED ALSAKER.
MANFRED STENE.